United States Patent Office 2,756,723
Patented July 31, 1956

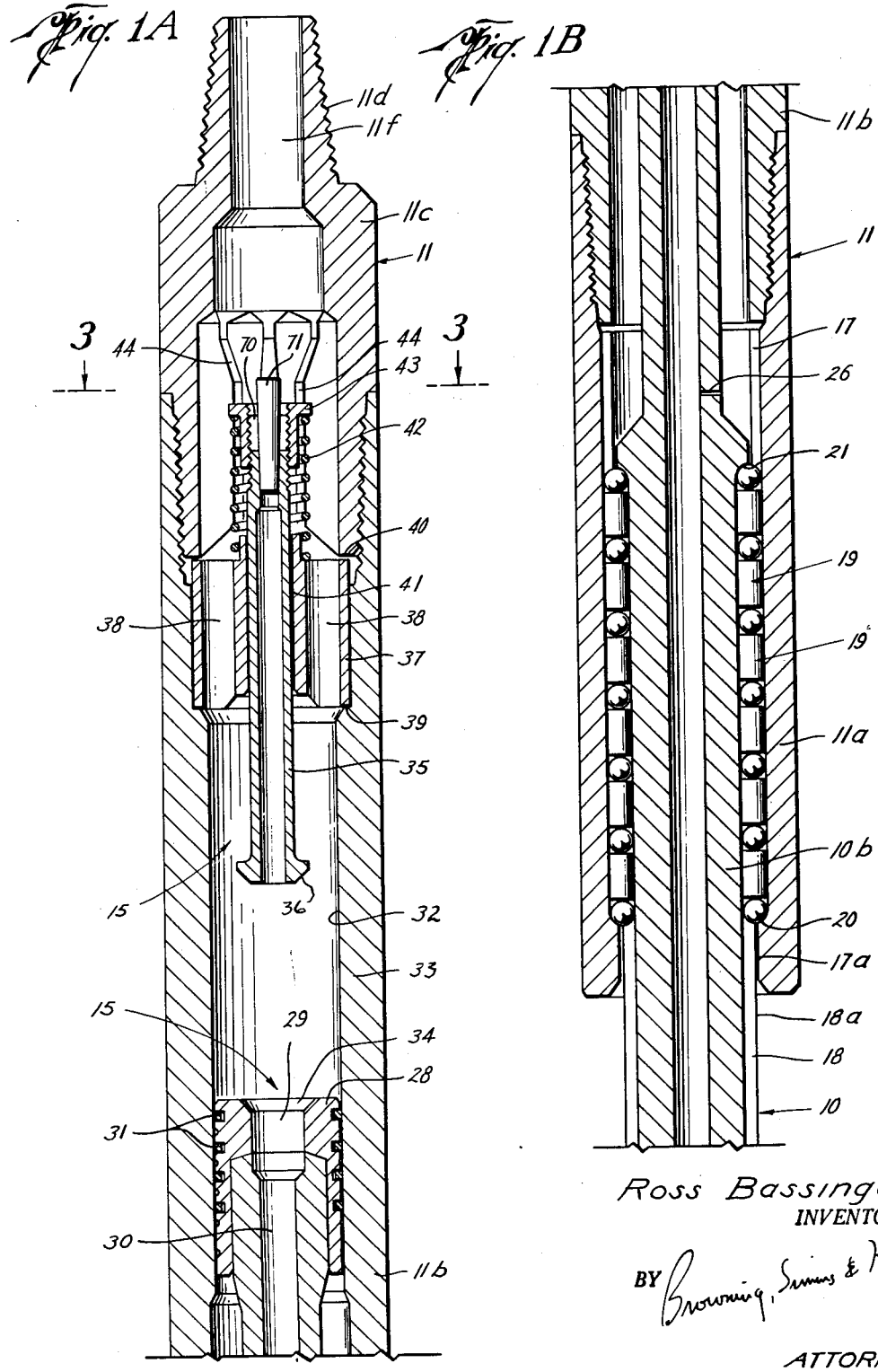

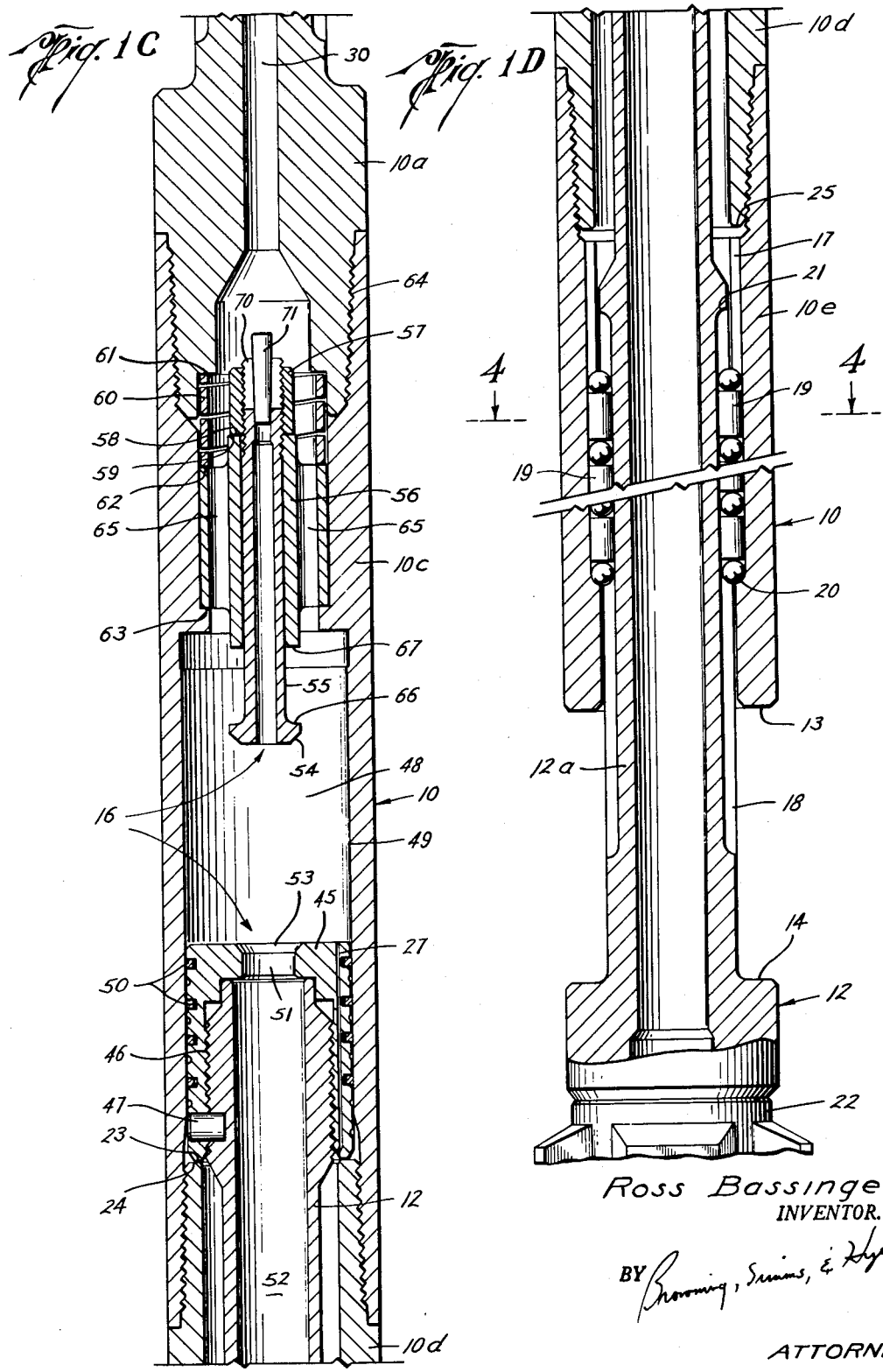

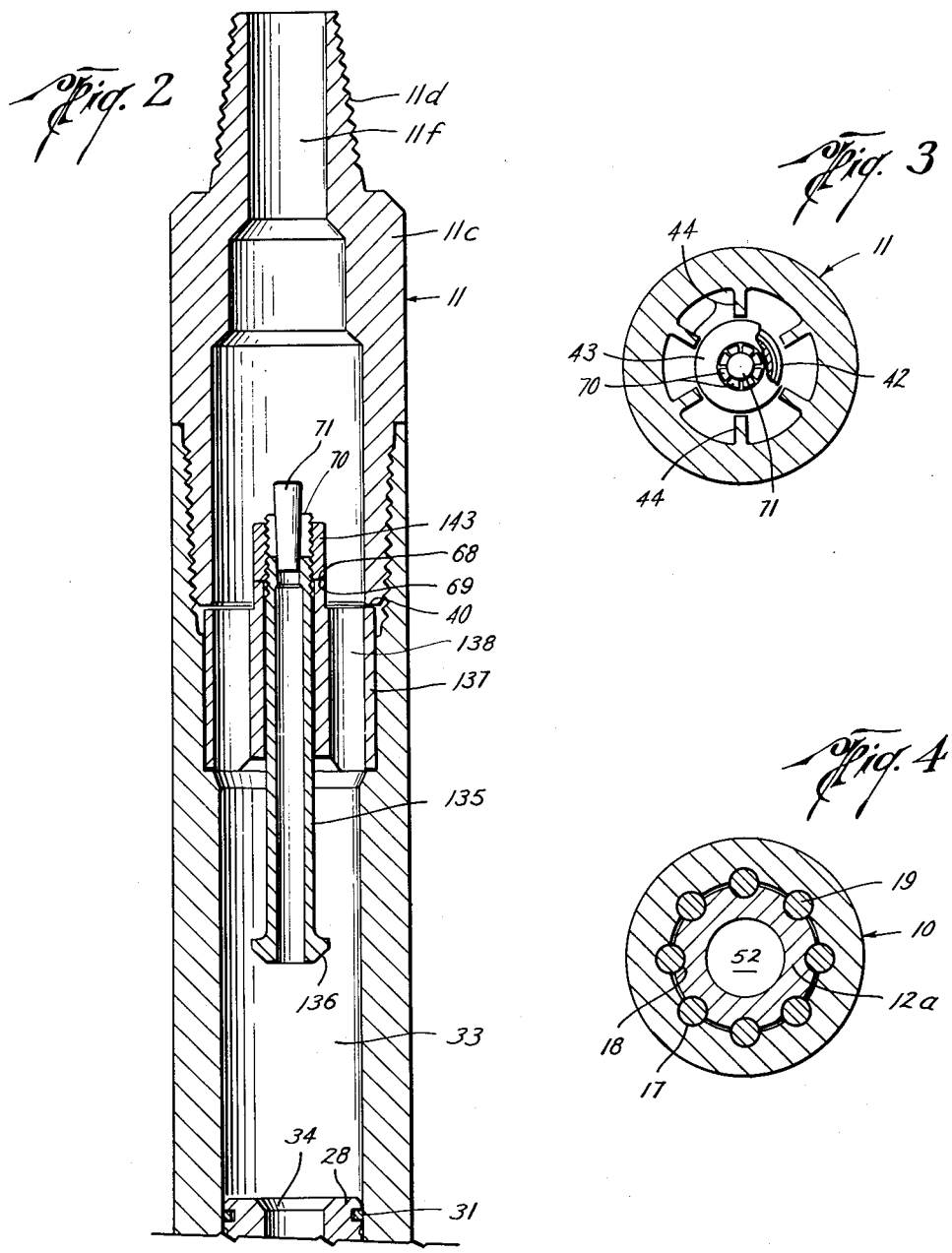

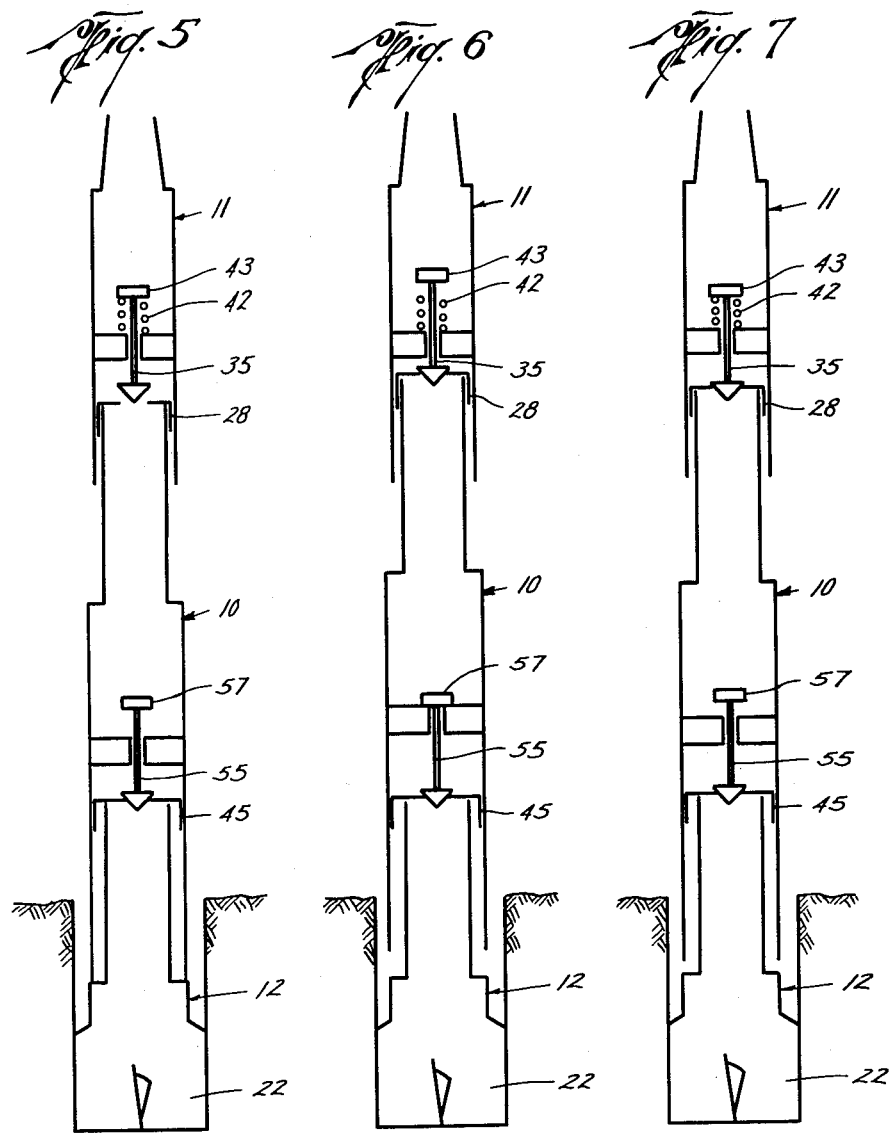

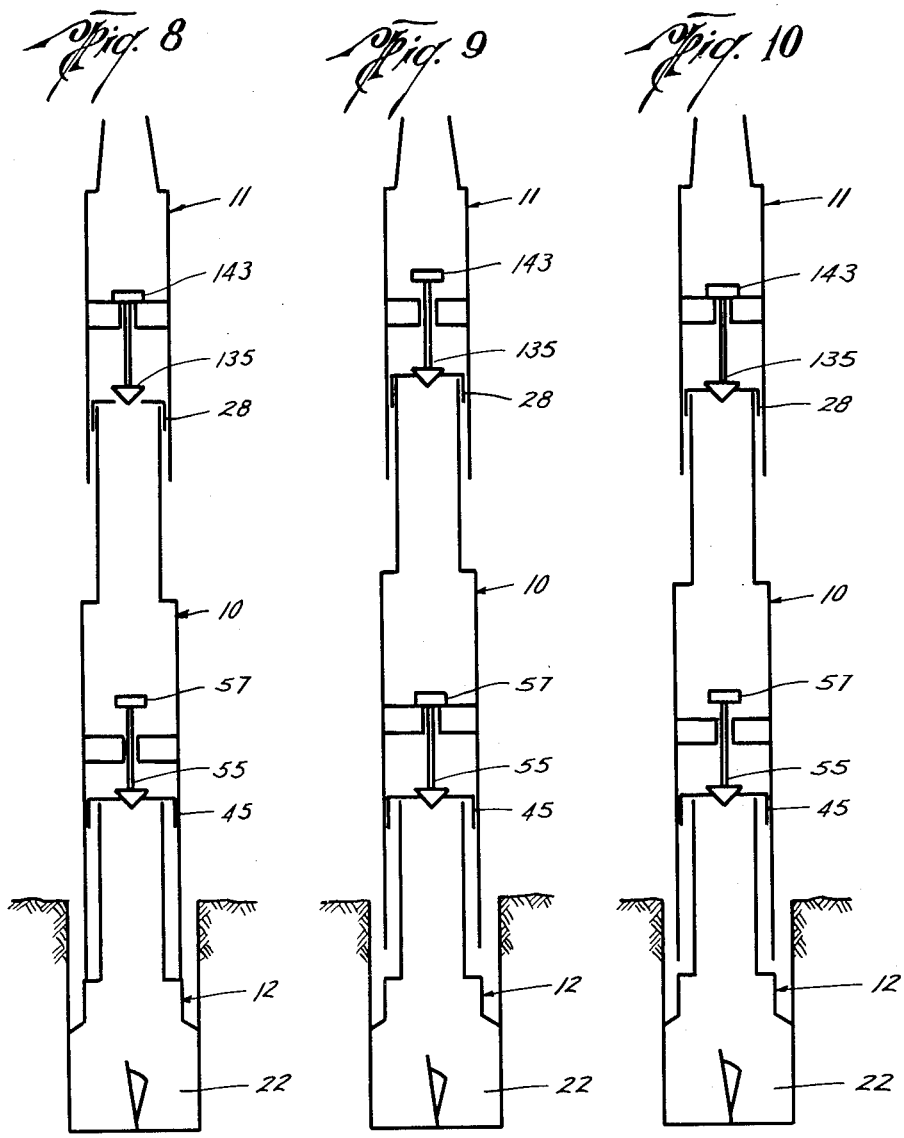

2,756,723

FLUID ACTUATED IMPACT TOOL

Ross Bassinger, New Braunfels, Tex.

Application May 19, 1954, Serial No. 430,937

25 Claims. (Cl. 121—30)

This invention relates to an impact tool adapted to be powered by a compressible fluid and particularly to one suited for drilling holes in the earth. In one of its aspects, it relates to a percussion tool providing an improved means for reciprocally mounting a hammer thereon.

A general object of the invention is to provide an improved impact tool, especially one for drilling bore holes in earth formations, wherein a compressible fluid is used to power the tool and to drive the hammer thereof in both its power and return strokes, all without excessive wastage of the power fluid, and wherein the hammer follows the bit down the bore hole as the latter is dug so that increased efficiency of energy delivery to the bit is realized. As a more specific object, the tool is especially adapted and arranged to be used in the drilling of relatively shallow holes such as quarry and seismic exploration shot holes. Another general object is to provide an improved means for mounting a hammer for reciprocation relative to an anvil and a conduit supplying motive fluid to the hammer and yet providing a torque transmitting connection between these elements.

In the past, it has been suggested that a liquid (drilling mud) be employed to power an impact tool in the drilling of a bore hole in the earth. In many instances, the use of a drilling mud is dictated by considerations other than supplying power to the impact tool; among such considerations are removal of cuttings from deep bore holes, maintaining a suitable hydrostatic head on certain types of formations penetrated during the drilling operation, lubrication of the drill bit, and others.

On the other hand, there are certain types of drilling operations which can be conducted without using a drilling mud. For example, the drilling of shot holes in quarry operations usually requires only a relatively shallow hole, say 60 feet or less, so that cuttings can be readily carried from the hole by an escaping compressible fluid used to power the drilling tool. Also, the drilling operation in such a situation is not one to readily lend itself to the use of drilling mud because rough terrain which is frequently encountered makes it difficult to move in and set up necessary equipment for handling mud, and it is usually easier to move in an air compressor or a portable steam generator than it is to set up necessary tanks, return lines, screens and the like as commonly employed with mud. Further, such an operation is sometimes conducted during freezing weather making it necessary to protect the mud from freezing and this is especially difficult since the drilling rig remains in one location only a relatively short time before moving to another. Accordingly, in such a type of drilling operation, it would be highly advantageous to be able to employ a readily generated compressible fluid, such as steam or air, in the drilling operation so as to avoid setting up for the handling of mud.

Heretofore, there has never been provided a drilling tool capable of relatively easy, economical and efficient use in such a type of drilling operation, and wherein the tool is powered by an easily generated compressible fluid. For example, in the drilling of taconite and other strata difficult to penetrate in quarry operations, drilling tools heretofore known have not been satisfactory for one reason or another and in some operations, flame drilling has even been used. The latter is expensive to operate and requires a considerable investment in equipment.

While percussion tools have been employed in drilling operations, particularly for very shallow small gage holes, such tools embody a hammer which remains at the surface and impact energy from the hammer is transmitted to the bit by means of a rod which extends into the hole and between the bit and percussion tool. As the drilling operation proceeds, additional lengths of rod are added to permit the percussion tool to remain at the surface. Accordingly, the efficiency of these tools decreases as the depth of drilling increases due to the greater amounts of impact energy lost in the increasing length of rods.

It is therefore an object of this invention to provide an impact tool adapted to be powered by a compressible fluid and particularly lending itself to the drilling of relatively shallow holes such as are employed in quarrying and other operations, the tool being so constructed and arranged that the hammer follows the anvil (and bit) down the hole as the drilling operation proceeds so that a maximum of impact energy is always transferred from the hammer to the bit irrespective of the depth of the drilling operation. Hence, such a tool can deliver as much energy to the bit at any depth as at the surface.

Another object is to provide an impact tool powered by a compressible fluid and arranged in such a manner that a hammer forming a part of the tool is reciprocated by such fluid and yet the fluid is not permitted to flow freely through the tool in operation without delivering energy to the tool.

Another object is to provide an impact tool powered by a unidirectional flow of a compressible fluid in such a manner that the fluid actuates a hammer to drive it alternately in opposite directions, the arrangement being such that the fluid is not permitted to flow through the tool without exerting a substantial force on the hammer to reciprocate the same thereby preventing wastage of the fluid before it has delivered energy to the tool.

Another object of this invention is to provide an impact tool arranged to trap a quantity of compressible driving fluid therein so that such trapped fluid can expand and move the hammer before the fluid is exhausted from the tool whereby an increased amount of useful energy is transferred from the driving fluid to the tool.

Another object is to provide an impact tool powered by a compressible fluid and of the type wherein valve means control flow of fluid through the tool in such a manner that a hammer is driven by the fluid in both its power and return strokes, the valve means being arranged to be such that all of them are never open at the same time so that flow of fluid through the tool is always restrained by at least one of the valve means thereby preventing wastage of the fluid.

Another object is to provide a tool of such type wherein it is not necessary to employ springs or other resilient means to bias the valve means to a preselected position with respect to the hammer or the anvil.

Another object is to provide a tool of such type which can be arranged so that compressible fluid can exert its pressure against a hammer during its entire power stroke whereby more power can be delivered by the tool than would otherwise be possible.

According to another aspect of this invention, there is provided an improved means for connecting the hammer to the anvil and/or the fluid supply conduit. In percussion tools of the type of this invention, there is usually involved at least one telescoping joint or connection between two elements which permits one element to move longitudinally with respect to the other but prevents relative rotation therebetween. As will be disclosed in more detail hereinafter, such joints are employed in the preferred form of the tool of this invention to connect the hammer to the anvil and to a fluid supply conduit in such a manner as to permit the hammer to reciprocate therebetween and yet to permit torque to be applied to the supply conduit for transmission through the hammer to the anvil and bit so as to rotate and index the latter. Such joints also maintain the hammer, anvil and supply conduit in proper alignment so that the hammer can properly perform its function.

In the joints heretofore suggested, there has been developed excessive friction not permitting sufficiently free extension and contraction of the joint and this has been particularly pronounced when considerable torque is transmitted through the joint. Also, the prior joints have been susceptible to failure due to galling and the like as caused by excessive friction or by the joint not maintaining the parts which it connects in proper alignment for free telescoping movement but permitting them to become axially misaligned so that upon such movement, excessive rubbing and consequent galling occurs.

It is therefore another object of this invention to provide a telescoping connection or joint particularly adapted for use in an impact tool under the adverse conditions frequently encountered in the drilling of a bore hole in the earth, the connection maintaining the parts which it connects in telescoping alignment and yet being capable of transmitting considerable torque without excessive friction developing so that the likelihood of the connection failing is reduced.

Another object is to provide such a connection in which the adjacent faces of the telescoping members are maintained in spaced relation by an arrangement of splineways and bearings so that such faces are prevented from rubbing together to develop excessive friction in the connection.

Another object is to provide such a connection in which the bearings are of sufficient length as to in themselves maintain the telescoping members in proper alignment.

Another object is to provide such a connection which is arranged in an impact tool so that fluid powering the tool acts to maintain the connection free from foreign debris, such as cuttings from a bore hole in the earth and to also, if desired, furnish lubricant to the connection.

Another object is to provide such a connection in which the splineways are made of greater length than that of the bearings therein so that upon extension and retraction of one telescoping member with respect to the other, the bearings can lag behind the movement of one member so that the rate of relative movement between the bearings and either of the telescoping members can be less than that between the members themselves.

Other objects, advantages and features of this invention will be apparent to one skilled in the art upon a consideration of the written specification, the appended claims and the attached drawings wherein:

Figs. 1A, 1B, 1C and 1D illustrate, partially in section and partially in elevation, an impact tool embodying this invention; it being understood that these figures are continuations one of the other in order above named with Fig. 1A being one end of the tool, Fig. 1D the other end and Figs. 1B and 1C being intermediate portions;

Fig. 2 shows an alternative embodiment for the portion of the tool illustrated in Fig. 1A;

Figs. 3 and 4 are cross-sectional views taken on the lines 3—3 and 4—4 of Figs. 1A and 1D, respectively;

Figs. 5, 6 and 7 are schematic illustrations of the operation of the impact tool shown in Figs. 1A through 1D; and Figs. 8, 9 and 10 schematically illustrate operation of the tool with the arrangement of Fig. 2 substituted for that of Fig. 1A.

Like characters of reference are used throughout the several views to designate like parts.

Generally, the illustrated apparatus of this invention includes a hammer 10 mounted for reciprocation relative to a fluid supply conduit 11 and an anvil 12, so that a striking face 13 of the hammer can deliver a percussive blow to anvil face 14. In the preferred form, the tool includes an upper and a lower valve means 15 and 16 arranged so that upon closing the upper valve means and opening of the lower valve means, the hammer is urged by the pressure of resilient (compressible) fluid from conduit 11 in a power stroke to ultimately deliver a blow to the anvil. Then upon opening of the upper valve means and with the lower one closed, the pressure of the power fluid acts to move the hammer in a return stroke to complete the cycle. The arrangement is such, as will be explained in detail below, that at least one of the valves means restricts flow through the tool at substantially all times so that free flow of fluid through the tool without exerting a desired actuating force on the hammer is prevented.

Turning now to a detailed description of the tool illustrated in Figs. 1A through 1D, hammer 10 is comprised of a plurality of sections detachably joined together as by threaded connections to permit ready assembly of the tool. These sections include a heavy-walled section 10a having a reduced diameter portion 10b telescoping in the conduit 11, a lower valve housing section 10c, a sub 10d and an impact section 10e.

Fluid supply conduit 11 can be composed of a plurality of lengths 11a, 11b, and 11c joined together by threaded connections and adapted to be connected to a drill string as by threaded end 11d.

Since fluid supply conduit 11 is maintained relatively fixed in elevation with respect to its operating environment such as a bore hole, during any one phase of the drilling operation, and since hammer 10 reciprocates relative thereto, a slidable connection is provided between these two elements and is arranged to permit relative longitudinal movement therebetween but to restrain relative rotation. According to one feature of this invention, an improved telescoping connection between the hammer and supply conduit is provided and includes telescoping parts carried by the hammer and conduit, such as reduced diameter portion or internal part 10b of the hammer and length or external part 11a of the fluid supply conduit. The adjacent faces of internal part 10b and external part 11a are supplied with a plurality of splineways 17 and 18, respectively, which extend longitudinally of these parts with each of splineways 17 being in radial alignment with one of splineways 18 so as to receive bearings 19 therein. The maximum outside diameter of internal part 10b is preferably made slightly smaller than the minimum inside diameter of external part 11a so that the adjacent faces 17a and 18a between these two parts are spaced apart slightly. The bearings are of such diameter relative to the total depth of the paired splineways that they bridge across the spacing between these two faces. Then, since the pairs of splineways are spaced circumferentially along the adjacent faces, the faces of these telescoping parts are maintained in laterally spaced apart relationship while the telescoping connection is being contracted and extended. As a result, faces 17a and 18a do not rub on each other and substantially all of the sliding friction between the telescoping parts is taken up by the bearings.

Each of splineways 17 and 18 preferably have a length substantially greater than the combined length of bearings 19 contained therein so that the bearings, upon extension and contraction of the telescoping connection or joint, are free to lag behind movement of one of the telescoping parts 10b or 11a. In this manner, the relative rate of movement between the bearings and either or both of these parts can be less than that between the parts themselves. The bearings are thus free to "float" somewhat in the splineways and to turn and continuously present new bearing faces to the walls of the splineways.

Bearings 19 are illustrated as alternate roller and ball bearings with the length of each roller bearing being twice the diameter of a ball bearing but can be comprised solely of ball bearings or solely of roller bearings.

Splineway 17 has an inturned terminus 20 while splineway 18 has a similar terminus 21, each of which are adapted to engage one end of the string of bearings 19 and limit the extension of the telescopic connection. Splineway 17, however, extends upwardly to open out at the threaded end of conduit length 11a to facilitate assembly of the joint. Thus, length 11a can be lowered over portion 10b, before length 11b is attached, so as to position the upper open end of splineway 17 below terminus 21 of splineway 18. The individual bearings can then be dropped into the splineways after which length 11b is made up with length 11a.

It will be noted with this type of telescoping connection, the combined length of bearings 19 within a pair of splineways is such as to present a bearing area extended along a substantial length of such pair of splineways and hence of the telescoping connection so that the bearings themselves tend to prevent any substantial axial misalignment between the telescoping members. Thus, friction between the telescoping parts is reduced to a minimum thereby permitting relatively free longitudinal movement between the parts and yet restraining them against relative rotational movement so that torque can be transmitted from the supply conduit to the hammer and thence to the anvil to rotate and index bit 22 attached to the anvil.

Since the bit or any other tool attached to the anvil, rests on the surface to be worked, such as the bottom of a bore hole, during the operation of the tool and hence is fixed relative to the reciprocal hammer, a telescoping connection can be provided between the hammer and anvil similar in construction to the one described above. Thus, in this instance, impact section 10e of the hammer and reduced diameter portion 12a of the anvil comprise the outer and inner telescoping parts, respectively, but otherwise the elements of the connection are the same as above described and hence have been given like reference characters. In this instance, however, extension of the telescoping joint is limited by stop parts 23 and 24 carried respectively by the anvil and the hammer so that terminus 21 of splineway 18 serves only to retain the bearings therebelow when shoulder 25 happens to be positioned above terminus 21. However, when stop parts 23 and 24 are not employed, the extension of the lower joint can be limited in the same manner as the upper one.

In order to prevent debris, such as cuttings from the bore hole, from accumulating or even passing into the splineways and bearings, means are provided to flush the telescopic connections with a portion of the fluid being used to power the tool. Thus, a small passageway 26 can be provided between the inner bore of reduced diameter portion 10b of the hammer and the space above the bearings 19 so that fluid from this inner bore can flow outwardly through the passageway and thence down through the bearings to escape at the lower end thereof and thereby sweep any foreign debris from the telescoping connection. Similarly, passageway 27 is provided for the lower telescoping connection between the hammer and anvil. If it is desired to lubricate the bearings and splineways of these connections, a suitable lubricant can be suspended in the compressible fluid being used to power the tool so that as a portion of this fluid flows through the bearings, the lubricant will be deposited thereon. In some instances, there may be sufficient leakage around the lower elements of valve means 15 and 16 to provide the desired flow of flushing fluid through the telescoping connections. However, it is preferred that separate passageways be provided to positively assure that a controlled amount of flushing fluid will always be available. It will be noted that each of passageways 26 and 27 communicates with a portion of the tool which is exposed to the pressure of fluid from the supply conduit at least part of the time so that a pressure differential will at least periodically exist across passageways 26 and 27 to force fluid between the telescoping parts of the connection.

To actuate the hammer, it is provided with an area disposed so that pressure fluid from supply conduit 11 can act thereagainst to move the hammer in a power stroke toward the anvil and also with another and larger area disposed in an opposite manner so that pressure fluid derived from the supply conduit can act to urge the hammer in a return stroke away from the anvil. Flow control means are also provided to vary the degree of fluid communication between the supply conduit and the larger area so that the pressure of the fluid exerted on this larger area can be increased to move the hammer in its return stroke against the force exerted by pressure fluid acting on all or part of the smaller area and then decreased to permit movement of the hammer in its power stroke by pressure fluid acting on the smaller area. Thus, the upper end of the hammer shown in Fig. 1A can be provided with piston means comprising a piston element 28 resting on, but not otherwise mechanically connected to, the top of reduced diameter portion 10b of the hammer and having a bore 29 communicating between the fluid supply conduit and passageway 30 in the hammer. Piston element 28 can have a plurality of piston rings 31 adapted to form a sliding seal with the bore walls 32 of cylinder 33 of fluid supply conduit 11 in which the piston element reciprocates with the upper end of the hammer.

As a part of the piston and flow control means, the piston element is provided with a valve seat 34 surrounding bore 29 so that the piston element also functions as a valve element. Another valve element 35 is reciprocally carried by the supply conduit and has a seat 36 adapted to mate with seat 34 of the piston element and thereby control flow of fluid from the supply conduit into passageway 30 of the hammer. It is apparent that with valve element 35 seated, flow through the piston element is effectively restricted so that the fluid from conduit 11 acts across the entire cross-sectional area of the piston element to urge the hammer toward the anvil. Also, upon unseating of valve element 35, the endwise area of piston element 28 exposed to pressure fluid from the conduit is reduced due to the opening of passages 29 and 30 through the piston element and hammer.

Cage 37, which has fluid passages 38 therethrough, is arranged to be retained in place between shoulders 39 and 40 of conduit lengths 11b and 11c, respectively, and slidably receives element 35 in bore 41. As a result, the valve element is free to ride in seated position upon piston element 28 and thereby follow, within the limits discussed below, the hammer in its power stroke so that force can be exerted on the hammer by the pressure fluid from the supply conduit throughout a substantial portion of the hammer's power stroke in order to thereby effectively accelerate the hammer so that it can deliver a maximum of percussive energy to the anvil and bit.

In order to unseat valve element 35 so as to permit flow of pressure fluid into the hammer and to decrease the effective area acted on by the pressure fluid in opposing movement of the hammer in its return stroke, actuating means are provided for this purpose and are made responsive to movement of the hammer so as to open the upper valve means 15 when the hammer has passed through a predetermined portion or all of its power stroke and to permit the valve means to close during the hammer's return stroke and before the lower valve means 16 has opened. Thus, a resilient means, such as spring 42, is disposed between the valve cage and nut 43 on valve element 35 so as to urge the valve element in a direction away from the hammer and anvil and to bias it to a position intermediate the extremities of its path of travel while in seated position on piston element 28 and hence while traveling with the hammer. It will be noted that spring 42 is not preloaded in the preferred form shown in Fig. 1A so that valve element 35 when in an at rest position, merely is supported by the spring 42 and is free to move upwardly and away therefrom without stretching the spring. A plurality of inwardly extending ribs 44 are provided on conduit length 11c to act as aligning guides for nut 43 and spring 42.

Lower valve means 16 control communication between the interior of the hammer and the exterior of the tool and can also comprise piston means including piston element 45 carried by the anvil, such as by being either merely seated upon the upper end of reduced diameter portion 12a of the anvil or threaded thereto as by threads 46 and secured in place against turning with a locking pin 47. In either case, piston element 45 is reciprocally received in a cylinder 48 in the hammer, here defined by bore 49, and can be provided with a plurality of sealing rings 50 to effect a sliding seal with the walls of the cylinder. The piston element is provided with a passage 51, communicating with passage 52 in the anvil which leads to the exterior of the tool, as through bit 22, so that fluid can be exhausted from the tool.

In order to control this exhausting of fluid and hence the pressure of the fluid upstream of piston element 45, the latter is also formed to act as a valve member such as by disposing a valve seat 53 thereon to surround passage 51 and to mate with seat 54 on a valve member 55. The latter is reciprocally carried by the hammer by means of cage 56 so that valve member 55 can remain seated on seat 53 while the hammer is moving with respect to the anvil through a predetermined portion of its power and return strokes. To unseat valve member 55 upon travel of the hammer a preselected distance from its anvil striking position, actuating means responsive to movement of the hammer are provided for effecting such function. Thus, the upper end of the valve member is provided with a nut 57, arranged with a shoulder 58 which acts with end 59 of the valve cage is mutually engageable stop parts to limit movement of the valve member with respect to the hammer. In this manner, downward movement of the hammer will seat valve member 55 upon seat 53 and yet permit the hammer to continue moving downwardly to strike a blow upon the anvil while stem of the valve member is sliding through valve cage 56. The hammer can then move a predetermined finite distance away from the anvil before stop parts 58 and 59 engage to unseat valve member 55.

Inasmuch as the hammer reciprocates, it is desirable that valve cage 56 be securely fastened in place so as to prevent end play thereof during this reciprocation. In order to provide this securement and to permit reasonable manufacturing tolerances for the cage and sections 10a and 10c, a heavy spring 60 is disposed between an inwardly extending shoulder 61 on hammer section 10a and end 62 of the valve cage so as to urge the latter against an inwardly extending shoulder 63 on hammer section 10c. Spring 60, in an unstressed condition, has a length substantially greater than the maximum distance which will exist between the upper end 62 of the valve cage and shoulder 61 when maximum variations in manufacturing tolerances are taken into account and is sufficiently strong so that upon making up of threaded joint 64, the resulting compression of the spring causes it to securely hold the valve cage tightly in place against shoulder 63 and to prevent any lengthwise shifting thereof during reciprocation of the hammer. As a result, shoulder 61 can vary within relatively broad limits in its proximity to end 62 of the valve cage and yet the latter is fixedly secured in place in the hammer.

Before explaining further the positioning and cooperation of valve means 15 and 16 with the other parts of the tool, it would probably aid in the understanding thereof to trace the path of fluid flow through the tool. The fluid enters via passage 11f (Fig. 1A) and then flows between ribs 44 through passages 38 in valve cage 37 and into cylinder 33 in which piston element 28 operates. When the upper valve means is open, the fluid will continue flowing downwardly through passages 29 and 30, passages 65 in valve cage 56, and into cylinder 48 in which piston element 45 reciprocates. When the lower valve means is in open position as shown in Fig. 1C, the fluid continues flowing through passages 51 and 52 and thence out of the tool, such as through bit 22.

As stated above, the hammer is provided with an area against which fluid from the supply conduit can act to urge the hammer in a power stroke toward the anvil and with a larger opposing area against which pressure fluid derived from the supply conduit can act to urge the hammer away from the anvil. For the construction shown in the drawings, it will be apparent that with valve means 16 open and valve element 35 seated on piston element 28, fluid from conduit 11 acts on an area equal to the cross-sectional area of the piston element 28 to urge the hammer toward the anvil; the force exerted on the hammer by the fluid being equal to the differential pressure across the piston element 28 multiplied by the cross-sectional area of the piston element.

However, with valve means 15 open and valve member 55 seated on piston element 45, pressure from the supply conduit will act against piston element 45 and attempt to move the anvil away from the hammer. Since the anvil is substantially fixed in its longitudinal position with respect to the supply conduit, such pressure fluid will act to urge the hammer away from the anvil and by making piston element 45 of larger cross-sectional area than that of piston element 28, pressure fluid from the conduit acts on an effective area equal to the difference between the cross-sectional areas of piston elements 45 and 28 to urge the hammer away from the anvil. When the hammer has moved away from the anvil a sufficient distance, stop parts 58 and 59 become engaged. At such time, the force resulting from pressure in cylinder 48 acting across the area of valve seat 53 to resist unseating of valve member 55 therefrom becomes effective in resisting movement of the hammer in its return stroke. Ordinarily, the upward momentum of the hammer at this point (i. e. with stop parts 58 and 59 in engagement) is sufficient when the hammer has achieved its normal operating frequency to pull valve member 53 off its seat. However, in a preferred embodiment of the tool, the effective area across seat 53 is made less than the difference in cross-sectional areas between pistons 28 and 45. With such construction, the net hammer will always be positively moved through its return stroke including the unseating of valve member 53 irrespective of the upward momentum of the hammer.

It may be of some aid in understanding the above described arrangement of areas and forces acting on the hammer to state the same mathematically for the tool shown in the drawings. Thus:

Given:

Cross-sectional area of pistons 28 and 45 are denoted as 28A and 45A, respectively.
Cross-sectional area of valve seat 53 is denoted as 53A.
Cross-sectional area of passage 30 is denoted as 30A.
Pressure of compressible fluid in supply conduit is P (assume pressure exteriorly of tool is zero), and,
45A is greater than 28A and 53A is less than 45A minus 28A.

Then:

*Case 1.*—If valve means 15 is open and valve means 16 is closed, the force acting downwardly on the hammer before stop parts 58 and 59 engage is $$P(28A-30A)$$

and the force acting upwardly on the hammer is $$P(45A-30A)$$

Therefore, the resultant force acting upwardly on the hammer is $$P(45A-30A)-P(28A-30A)$$

which, removing parentheses, becomes $$P45A-P30A-P28A+P30A$$

or $$P45A-P28A$$

Then, since 45A is greater than 28A, the resultant force on the hammer is upward and it moves away from the anvil.

*Case 2.*—If valve means 15 is open and valve means 16 closed but hammer has moved away from anvil far enough to engage stop parts 58 and 59, then, neglecting upward momentum of hammer, the force acting down on the hammer is $$P(28A-30A)+P53A$$

and the force acting up on the hammer is $$P(45A-28A)$$

Hence, the resultant force acting up on the hammer is $$P(45A-30A)-P(28A-30A)-P53A$$

or $$P(45A-28A-53A)$$

Then, since 45A minus 28A is greater than 53A and 45A is greater than 28A, the resultant force on the hammer is upward and the hammer will move away from the anvil and unseat valve member 55 irrespective of the upward momentum of the hammer.

Thus it will be apparent that with valve means 15 open and valve means 16 closed, the total area of all surfaces on the hammer which are exposed to pressure fluid from the supply conduit and which are also disposed so that such fluid can act to urge the hammer away from the anvil must be larger than the total area of all surfaces likewise exposed to such pressure fluid and disposed to permit the fluid to urge the hammer toward the anvil. It will also be apparent that this differential in area upon which pressure fluid effectively acts to move the hammer in its return stroke is situated upstream of valve means 16 and downstream of valve means 15 so that by alternately opening and closing these valve means, pressure on the effective differential area is increased and decreased to respectively move the hammer in its return stroke and to permit it to move in its power stroke under the influence of pressure fluid acting on the smaller area.

In order to lift the hammer against gravity in such a situation (with the upper valve means 15 open), the difference in areas must be large enough that the force exerted by pressure fluid acting thereagainst is greater than the weight of the hammer. However, in a preferred form of this invention, the upper valve means 15 closes while the hammer is in its return stroke and before the lower valve means is opened in order to trap pressure fluid between the closed valve means, as shown in Fig. 6. At the instant the upper valve means closes, there does not exist any pressure differential thereacross. However, continued upward movement of the hammer increases the volume of the space occupied by the fluid trapped between the upper and lower valve means (due to an increase in the volume of cylinder 48 above piston element 45 as the hammer moves upwardly) and consequently, the trapped fluid expands and decreases in pressure with resultant corresponding delivery of energy to the rising hammer. As a result, a pressure differential develops across seat 34 and piston element 28 of the upper valve means tending to resist upward movement of the hammer and this differential will increase as the hammer moves upwardly. Accordingly, the above-noted difference in areas (i. e. the difference between the cross-sectional areas of piston elements 45 and 28 and, in the preferred embodiment, this latter difference less the area of seat 53) must be large enough relative to the volumetric change in the trapped fluid that at the minimum pressure of the latter, sufficient upward force is still developed to move the hammer upwardly against the ever increasing differential across the top valve means, until such movement of the hammer causes the lower valve means to open. Of course, the arrangement could be such that the net upward force exerted by the trapped fluid would become less than the net downward force on the hammer before the lower valve means opened with reliance on the upward momentum of the hammer to move it far enough away from the anvil to open the lower valve means but it is preferred that the arrangement of areas be such that the net upward force always exceeds the net downward force while both valve means are closed so that the hammer's action is made more positive.

The sequence of operation of the valve means and other parts of the illustrated tool is believed to be apparent from the foregoing. However, a description of the operation of the tool may be of further assistance in understanding such sequence as well as the required spacing of the various valve elements and members to achieve the sequence.

In Figs. 1A through 1D, the tool is shown with its parts disposed in the position they occupy when no fluid is flowing through the tool and when the latter is suspended from a drill string or the like. As the tool is lowered into a bore hole so as to rest the bit on the bottom thereof, the telescoping connection between the hammer and anvil contracts until valve member 55 seats on piston element 45. Continued lowering of the drill string then causes the valve member to slide relative to cage 56 until hammer face 13 rests on the anvil face 14 at which time shoulder 58 is spaced from shoulder 59 on the valve cage. The drill string, which extends to the surface for connection to a source of compressible fluid, such as a boiler or compressor, is lowered still further until seat 36 on valve element 35 is spaced from seat 34 a distance less than that between shoulders 58 and 59. Flow of fluid through the tool is thus blocked by the lower valve means and, as a result, the pressure of the actuating fluid will act to push the hammer upwardly (Fig. 5). Then as the hammer moves upwardly, the upper valve means closes (Fig. 6) to block flow of fluid through the tool and to trap fluid between the upper and lower valve means. The hammer continues further upward movement, under the force applied by the trapped fluid as explained above, until stop parts or shoulders 58 and 59 engage to unseat valve member 55. The resultant exhaust of trapped fluid permits the full pressure of the fluid in the supply conduit to become effective across the upper piston element 28 to overcome the upward momentum of the hammer existing upon opening of the lower valve means and then to move the hammer downwardly in its power stroke. The amount of upward movement of the hammer from the point at which the lower valve opens to the point at which upward travel of the hammer is halted can be termed "overtravel."

As the hammer moves upwardly after seating of valve element 35 on seat 34, the valve element is moved upwardly also so that nut 43 is spaced from the upper end of spring 42. As the hammer begins its downward movement, the pressure differential across valve element 35 and seat 34 maintains the element seated so that it rides downwardly with the hammer. Nut 43 will thus return to abutment with spring 42 and the latter will be compressed as the hammer continues in its power stroke. In a preferred form the strength of spring 42 is insufficient to overcome the pressure differential maintaining valve element 35 on its seat until the hammer strikes the anvil.

At that time, the jar and compression of the hammer aids the spring in unseating valve element 35 so that the latter can be returned by the spring to its at rest position. With such an arrangement, it will be apparent that the pressure fluid will be effective in driving the hammer throughout its entire power stroke so that maximum energy is delivered to the anvil and bit. This is true even though the lower valve means closes before the hammer strikes the anvil (Fig. 7) since closing the lower valve means merely traps fluid at the pressure exterior of the tool (usually atmospheric) and the compression of this fluid exerts little effect in decreasing the gain in downward momentum of the hammer.

Since the lower valve member 55 seats before the hammer strikes the anvil and before the upper valve means 15 opens, it will be apparent that as soon as the upper valve element 35 has become unseated, pressure fluid from the supply conduit can flow into the hammer to begin its return stroke.

From the foregoing, it is apparent that the position of valve member 55, with stop parts 58 and 59 engaged, is such that the longitudinal spacing between seat 54 and striking face 13 of the hammer is less than the longitudinal spacing between seat 53 and anvil face 14 so that the valve member can be seated upon seat 53 before the hammer strikes the anvil. This difference in spacing determines the "push-up" distance of the hammer, i. e. that portion of the hammer's return stroke which is powered by the pressure fluid, the total return stroke being equal to the "push-up" plus "overtravel." As was noted above, nut 57 moves upwardly relative to valve cage 56 to space stop parts 58 and 59 apart (Fig. 5) and this spacing, with faces 13 and 14 in abutment, will be equal to the "push-up" of the hammer.

The upper valve element 35 is positioned in the supply conduit, when the latter is properly positioned for its telescoping connection with the hammer to be freely effective, so that the valve element will seat upon seat 34 at a time not later than, and preferably before, stop parts 58 and 59 engage to unseat the lower valve member. Thus, the spacing between seats 36 and 34, with valve element 35 in an at rest position and faces 13 and 14 of the hammer and anvil in contact, is not greater than and preferably less than the spacing between stop parts 58 and 59 ("push-up" distance). As a result, the top valve means will close not later than the bottom valve means opens during the return stroke of the hammer and will not open during the power stroke before the bottom valve means closes. By lowering the supply conduit toward the anvil, the upper valve means can be made to close earlier in the return stroke so that the extent of hammer travel with fluid trapped between the valve means can be adjusted. However, it should be noted that the return stroke of the hammer will always be equal to the "push-up" distance plus the "overtravel" distance. In effect then, varying the position of the supply conduit changes only the "overtravel" distance. Thus, a maximum "overtravel" will be secured when the upper valve element 35 is positioned so that it becomes seated a little before or at substantially the same time the lower valve member is unseated. The reason for this is that full fluid supply conduit pressure is applied to move the hammer upwardly during substantially all of the "push-up" distance portion of its return stroke. This gives the hammer increased upward momentum so that the "overtravel" increases also. Conversely, with the fluid supply conduit lowered to a position such that the upper valve means closes during the early part of the return stroke and at a point after which the hammer must continue traveling upwardly a considerable distance before the lower valve member is unseated, the pressure trapped between the two valve means will be considerably reduced (by expansion) below full supply pressure. As a result, the average force acting to urge the hammer upwardly during the "push-up" distance is less and accordingly the hammer has less upward momentum at the time lower valve element 35 unseats so that the "overtravel" is decreased.

It will be noted that the length of valve member 55 is such that a space exists between shoulder 66 and the lower end 67 of the valve cage even when the hammer is resting upon the anvil. Such spacing permits the hammer to strike the anvil without transmitting percussive force to the valve cage via the valve member. In other words, if the shoulder 66 were to seat with end 67 before the hammer struck the anvil, cage 56, valve member 55 and associated parts would have to absorb the percussive energy generated by the hammer and there would result considerable damage and destruction of the valve structure.

Referring to Fig. 2, there is shown an embodiment of the upper valve means corresponding in over-all function to that of Fig. 1A and is generally similar thereto except that spring 42 of Fig. 1A has been omitted and the valve structure generally conformed to that for the lower valve means as shown in Fig. 1C. Thus, there is provided a cage 137 having a plurality of passageways 138 therethrough and reciprocally receiving a valve element 135. The valve element has a seat 136 adapted to seat with seat 34 of piston element 28. The upper end of the valve element is provided with a nut 143 secured to the valve stem. The nut and valve cage provide mutually engaging stop parts 68 and 69 to limit downward movement of valve element 135 with respect to the conduit. Valve element 135 is positioned within the fluid supply conduit such that when the latter is lowered to render its telescoping connection with the hammer free for reciprocation, valve seat 136 is spaced from seat 34 a distance less than the "push-up" distance of the hammer. Preferably, the spacing is substantially less than the "push-up" distance so that the upper valve element 135 can ride on the hammer in seated position throughout almost all of the power stroke of the hammer and consequently through almost all of the return stroke of the hammer. The spacing between the seats can be adjusted by raising and lowering the supply conduit. With this arrangement, it will become apparent that upper valve element 135 will become unseated when the hammer moves downwardly to a preselected position with respect to the anvil and will become seated upon the hammer moving upwardly after striking the anvil to such preselected position. It is apparent that this preselected opening and closing position for the upper valve means is intermediate the extremities of the path of hammer travel with the lower valve means closed whereby at least one of the upper and lower valve means is closed at all times.

With the exception of the difference in action of the upper valve means, the operation of the tool is the same as that described with reference to Figs. 1A through 1D.

Thus referring to Figs. 8 to 10, the hammer is shown in Fig. 8 at the beginning of its return stroke with the lower valve means closed and the upper open. As the hammer moves upwardly, the upper valve means closes to trap fluid in the hammer (Fig. 9). Upward movement of the hammer with the bottom valve means closed is continued through the remainder of the "push-up" distance after which the hammer overtravels with only the upper valve means closed and then begins its power stroke. Prior to opening the top valve means during the power stroke, the lower valve means closes while the hammer continues its power stroke (Fig. 10). Then before the hammer strikes the anvil, the upper valve means is opened after which the percussive blow is delivered to the anvil and the cycle completed.

It will be obvious from the foregoing, that the drill string or pipe is connected to supply conduit 11 to supply compressed fluid thereto and that such drill string extends to the surface where it is supported by a suitable rig. The length of the drill string can be increased as drilling proceeds by the connection of additional lengths thereof to the upper end of the drill string. In this manner, the percussion tool follows the bit down the hole so that the same amount of energy can be transmitted to the bit at any depth of drilling. Also the distance between the anvil striking face and the cutting edge of the bit can be made such that a maximum of impact energy from the hammer is delivered to the bit cutting edge and the earth formation. Such distance can then be maintained constant instead of increasing with increasing depths of drilling operations as in conventional pneumatic drills.

I the past, a great deal of difficulty has been encountered in maintaining a threaded nut, such as nuts 43, 57 and 143 in place on a valve element or member during the operation of the tool. Many different types of arrangements, including elastic stop nuts, lock washers, et cetera, have been tried but have failed for one reason or another. The special construction shown in Figs. 1A, 1C and 2 has been found to be satisfactory in that it maintains the nut fixed in position during even extended periods of operation of the tool under the adverse conditions encountered in a bore hole in the earth.

In accordance with this construction, the upper end of valve element 35 and the inside of nut 43 are both provided with a tapered thread as, for example, one tapering ¾ inch per foot. The upper end of the valve element is longitudinally slotted to provide a plurality of upstanding portions 70. The internal bore of the valve stem laterally adjacent and at these upstanding castellations is either of constant diameter or with a taper less than that of taper pin 71. In either event, nut 43 can be tightly screwed to the upper end of valve element 35 and then pin 71 tapped into place to spread castellations 70 slightly outwardly and thereby bind nut 43 in place. It is preferred that the taper of pin 71 and that of the internal bore of the valve member in contact therewith, if any, be such as to provide a sticking taper between the pin and the valve member. Nuts 57 and 143 in Figs. 1C and 2 are similarly secured in place and, hence, corresponding parts have been given like characters of reference.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In an impact tool powered by a compressible fluid and including a fluid supply conduit means and an anvil means arranged for relative longitudinal movement therebetween, a hammer mounted for reciprocation relative to the conduit means and anvil means, said hammer being provided with a first area exposed to fluid pressure from the conduit means to urge the hammer toward the anvil means and a second area arranged to be placed in fluid communication with the conduit means so that fluid therefrom can act against the second area to urge the hammer away from the anvil means, the second area also being arranged to be placed in fluid communication with the exterior of the tool and being larger than the first area, the improvement which comprises in combination therewith of control means for varying the degree of fluid communication of said second area with the conduit means and with the exterior of the tool to thereby increase and decrease the pressure applied to said second area, the control means for varying the degree of fluid communication between the second area and the exterior of the tool including valve means carried at least in part by the anvil means and openable to increase the degree of fluid communication between the second area and exterior of the tool responsive to the hammer moving away from the anvil means to a first position relative to the anvil means so that opening of the valve means is made dependent upon the relative longitudinal positions of the hammer and anvil means, said control means being actuatable responsive to movement of the hammer to increase degree of fluid communication between said second area and said conduit means when the hammer is in a second position relative to the anvil means, the first position being more remote from the anvil means than the second position, said control means also being actuatable to decrease the degree of fluid communication of said second area with one of said conduit means and said exterior of the tool before increasing the degree of fluid communication with the other, whereby the hammer is caused to reciprocate and yet fluid is prevented from flowing freely through the tool without exerting a substantial actuating force on the hammer.

2. In an impact tool powered by a compressible fluid and including a hammer mounted for reciprocation relative to a fluid supply conduit and an anvil, said hammer being provided with a first area exposed to fluid pressure from said conduit to urge the hammer toward the anvil, said hammer also being provided with a second area disposed to be placed in fluid communication with the conduit and with the exterior of the tool, said second area being larger than the first area and disposed so that fluid pressure from the conduit can act thereagainst to urge the hammer away from the anvil, the improvement which comprises in combination therewith a flow control means for alternately restricting and increasing flow of fluid both upstream and downstream of the second area so as to alternately increase and decrease the pressure on the second area, said control means being actuatable responsive to movement of the hammer and including valve means comprising valve elements carried respectively by the hammer and anvil and being movable to open position to increase flow of fluid downstream of the second area responsive to movement of the hammer away from the anvil and after the control means has restricted flow upstream of the second area, said valve means being movable to closed position responsive to movement toward the anvil before the control means increases flow of fluid upstream of the second area.

3. In an impact tool powered by a compressible fluid and including a hammer mounted for reciprocation relative to a fluid supply conduit and to an anvil, said hammer having a first area exposed to fluid pressure from said conduit to urge the hammer toward the anvil and a second area larger than and opposing the first area and disposed to be placed in communication with said conduit so that fluid pressure from the conduit can be applied to said second area to urge the hammer away from the anvil, said second area also being disposed to be placed in communication with the exterior of the tool, the improvement which comprises in combination therewith a first valve means for interrupting fluid communication of said second area with said conduit, second valve means for interrupting fluid communication of said second area with the exterior of said tool, each of the valve means comprising first and second elements respectively carried by the conduit and hammer and by the hammer and anvil to be moved between open and closed positions responsive to reciprocatory movement of the hammer, the longitudinal spacing of the conduit-carried element relative to the anvil-carried element being such that one of said valve means opens after the other valve means has closed and said other valve means opens after said one valve means has closed whereby the hammer is reciprocated and yet fluid is substantially prevented from flowing freely through the tool without exerting substantial actuating force upon the hammer.

4. The tool of claim 3 in combination with actuating means arranged to open said first valve means with the hammer in a first position with respect to the anvil and moving toward the anvil in a power stroke and to permit said first valve means to close when the hammer returns to said first position while moving in its return stroke, said actuating means permitting said second valve means to remain closed while said hammer moves a finite distance beyond said first position and away from anvil striking position in its return stroke.

5. The tool of claim 3 in combination with actuating means arranged to open the first valve means with the hammer in a first position relative to the anvil and with the second valve means closed and then to permit the first valve means to close upon finite movement of the hammer away from anvil striking position and toward a second position more remote from the anvil than the first position, said actuating means permitting both the first and second valve means to remain closed until the hammer reaches said second position and then causing the second valve means to open.

6. An impact tool powered by a compressible fluid which comprises, in combination, a fluid supply conduit, an anvil, a hammer mounted for reciprocation relative to the conduit and anvil from a position remote from the anvil to an anvil striking position, said hammer having a first area exposed to fluid from said conduit to urge the hammer toward the anvil and a second area disposed oppositely from the first area, the second area being larger than the first area, a fluid passageway for placing the second area in communication with the conduit and with the exterior of the tool, first and second valve means disposed to control flow through said passageway respectively upstream and downstream of the second area and each including a pair of valve elements carried by the conduit and hammer and by the hammer and anvil respectively, first actuating means for opening said first valve means subsequent to movement of the hammer in its power stroke toward the anvil from said remote position and before the hammer has moved a substantial distance from the anvil after striking the same and then permitting said first valve means to close after finite movement of the hammer in its return stroke away from the anvil, second actuating means for opening the second valve means upon movement of the hammer through a substantial proportion of its return stroke from the anvil toward said remote position and subsequent to closing the first valve means and permitting closing of the second valve means prior to opening the first valve means.

7. An impact tool powered by compressible fluid which comprises, in combination, a fluid supply conduit, an anvil, a hammer telescopically connected to said conduit and anvil for limited reciprocal movement relative thereto, fluid passageways in the hammer and anvil for communicating said conduit with the exterior of the tool, first valve means comprising an element carried by the hammer and an element reciprocally carried by said conduit to seat with the hammer-carried element and limit flow through said hammer passageway when so seated, second valve means for controlling flow through said anvil passageway and comprising an element carried by the anvil, another element reciprocally mounted on the hammer to seat with the anvil-carried element upon movement of the hammer toward the anvil, said hammer being provided with a first area exposed to fluid from the conduit and disposed so that fluid pressure acting thereagainst urges the hammer toward the anvil, said hammer also being provided with a second area disposed so that fluid pressure upstream of the second valve means when seated urges the hammer away from the anvil, the second area being larger than the first, first actuating means for opening the first valve means responsive to movement of the hammer in its power stroke and permitting closing of the first valve means upon movement of the hammer in its return stroke, and second actuating means opening the second valve means after the first valve means has closed and permitting the second valve means to close before the first valve means has opened.

8. The tool of claim 7 wherein the first actuating means is arranged to open the first valve means while said hammer is moving in its power stroke and before it strikes said anvil.

9. The tool of claim 8 wherein said first actuating means comprises resilient means biasing the conduit-carried element of the first valve means away from the hammer but permitting such element to remain in seated position until the hammer strikes the anvil, said resilient means being insufficiently strong to unseat the conduit-carried element prior to the hammer striking the anvil but of sufficient strength to move the conduit-carried element in a direction away from the hammer upon the hammer striking the anvil and thereby tending to jar the conduit-carried element from its seat.

10. An impact tool powered by compressible fluid which comprises, in combination, a fluid supply conduit, an anvil, a hammer telescopically connected to said conduit and anvil for limited reciprocal movement relative thereto, a fluid passageway in the hammer arranged for communicating said conduit with the exterior of the tool, first valve means comprising an element carried by the hammer and an element reciprocally carried by said conduit to seat with the hammer-carried element and limit flow through said hammer when so seated, second valve means for controlling flow through said passageway and comprising an element carried by the anvil and another element reciprocally mounted on the hammer to seat with the anvil-carried element upon movement of the hammer toward the anvil, said hammer being provided with a first area exposed to fluid from the conduit and disposed so that fluid pressure acting thereagainst urges the hammer toward the anvil, said hammer also being provided with a second area disposed to be exposable to fluid from the hammer passageway upstream of the second valve means and disposed so that pressure of such fluid urges the hammer away from the anvil, the second area being larger than the first, first stop parts carried by the conduit and the conduit-carried element of the first valve means for mutual engagement to open the first valve means upon movement of the hammer in the direction of the anvil to a first position and permitting closing of the first valve means upon movement of the hammer in a direction away from the anvil to at least return to said first position, and second stop parts carried by the hammer and the hammer-carried element of the second valve means for mutual engagement upon movement of the hammer away from the anvil to open the second valve means after the first valve means has closed and permitting the second valve means to close before the first valve means has opened.

11. The apparatus of claim 10 wherein said second stop parts are positioned for said mutual engagement to open the second valve means after the hammer has moved through a substantial distance with both valve means closed whereby fluid trapped between the valve means will expand substantially to deliver energy to the hammer before the second valve means releases it to flow to the exterior of the tool.

12. An impact tool powered by compressible fluid which comprises, in combination, a fluid supply conduit, an anvil, a hammer telescopically connected to said conduit and anvil for limited reciprocal movement relative thereto, a fluid passageway at least a portion of which is in the hammer for communicating said conduit with the exterior of the tool, first valve means comprising an element carried by the hammer and an element reciprocally carried by said conduit to seat with the hammer-carried element and limit flow through said hammer when so seated, second valve means for controlling flow through said passageway and comprising an element carried by the anvil and another element reciprocally mounted on the hammer to seat with the anvil-carried element upon movement of the hammer toward the anvil, said hammer being provided with a first area exposed to fluid from the conduit and disposed so that fluid pressure acting thereagainst urges the hammer toward the anvil, said hammer also being provided with a second area exposed to fluid upstream of the second valve means and disposed so that pressure of such fluid urges the hammer away from the anvil, the second area being larger than the first, resilient means between the conduit and the conduit-carried element of the first valve means biasing such element away from the hammer to a position intermediate the path of travel of the element to open the first valve means upon movement of the hammer in the direction of the anvil to a first position and permitting closing of the first valve means upon movement of the hammer in a direction away from the anvil, and second stop parts carried by the hammer and the hammer-carried element of the second valve means for mutual engagement upon movement of the hammer away from the anvil to open the second valve means after the first valve means has closed and permitting the second valve means to close before the first valve means has opened.

13. An impact tool powered by a resilient fluid which comprises, in combination, a fluid supply conduit; an anvil; a hammer mounted for reciprocal movement between said conduit and anvil, the conduit and anvil being arranged to permit relative longitudinal movement therebetween, said hammer having a fluid passageway forming a portion of a fluid passage through the tool for communicating said conduit with the exterior of the tool; first piston means including a first valve element carried by the hammer and a second valve element carried by the conduit to cooperate with the first valve element to limit flow from the conduit into the passageway in the hammer, said first piston means with the valve elements in closed position being reciprocal in the bore of said conduit to provide a first area exposed to fluid pressure in said conduit to urge the hammer toward the anvil; second piston means including a first valve member carried by the anvil and a second valve member carried by the hammer to cooperate with the first valve member to limit flow from the hammer passageway to the exterior of said tool, said second piston means with the valve members in closed position being reciprocal in a bore provided in one of the hammer and conduit provided as a part of said passage through the tool, the cross-sectional area of the second piston means being greater than that of the first; said first and second valve element being arranged to be opened responsive to movement of the hammer in the direction of the anvil to a first position and closed upon movement of the hammer in a direction away from the anvil; and the first and second valve members being arranged to be opened upon movement of the hammer away from the anvil beyond the point at which said first and second valve elements have closed and to be closed upon movement of the hammer toward the anvil and before it reaches said first position.

14. The tool of claim 13 in combination with resilient means between the conduit and second valve element biasing the second valve element in a direction away from the anvil and to an at-rest position intermediate the path of travel of the second valve element while in closed position with respect to the first valve element.

15. The tool of claim 14 wherein said resilient means is of such strength and length as to permit said second valve element to remain in closed position with the first valve element until the hammer strikes the anvil and then to move the second valve element to said intermediate position.

16. The tool of claim 13 wherein said second valve element is reciprocally carried by the conduit and wherein stop parts are respectively carried by the conduit and second valve element and arranged to engage to unseat said second valve element upon movement of the hammer to said first position.

17. A fluid actuated tool which comprises, in combination, a fluid supply conduit, an anvil, a reciprocal hammer telescopically connected with the anvil for limited movement relative thereto and having a portion telescoping within said conduit, said conduit, anvil and hammer having interconnecting fluid passageways therein, with an enlarged portion of the passageway in said hammer being of greater cross-sectional area than the cross-sectional area of at least a portion of the conduit passageway, first and second piston elements carried by the anvil and hammer for reciprocation in said enlarged passageway portion of the hammer and said portion of the conduit passageway respectively, each of said piston elements having a passage therethrough forming a part of said interconnecting passageways, first and second poppet valves reciprocally mounted on the hammer and conduit respectively for seating with the first and second piston elements respectively to block flow through said passages, stop parts carried by the hammer and second poppet valve for mutual engagement upon movement of the hammer away from the anvil to a first position to unseat said second poppet valve from said second piston element and to permit seating of said second poppet valve with said second piston element upon movement of the hammer toward said anvil to at least said first position, and means for unseating said first poppet valve from said first piston element upon movement of the hammer toward said anvil but after the hammer passes beyond said first position and to permit seating of said first poppet valve with the first piston element upon movement of the hammer away from the anvil but before it reaches said first position.

18. In an impact tool including a hammer mounted for reciprocation relative to a fluid supply conduit and an anvil, said hammer being provided with a first area exposed to fluid pressure from the conduit to urge the hammer toward the anvil and a second area disposed to be placed in fluid communication with the conduit to urge the hammer away from the anvil, the second area being larger than the first, and wherein control means actuated responsive to movement of the hammer are provided for selectively increasing and decreasing the pressure applied to the second area so as to cause the hammer to move away from the anvil and then to permit it to move toward the anvil under the influence of pressure exerted on said first area, which comprises in combination therewith of a mounting for said hammer including telescoping parts carried by the hammer and at least one of said anvil and conduit, said parts having adjacent opposing faces radially spaced apart from each other, a plurality of longitudinally splineways in each of said faces extending parallel to the direction of movement of the hammer, said splineways in one part being radially aligned with a splineway in the other part and bearings in and bridging between the aligned splineways to maintain said faces in spaced apart relationship during telescoping movement between said parts and preventing substantial rotative movement between the parts.

19. The tool of claim 18 wherein each pair of aligned splineways contains a plurality of said bearings and the splineways in each of said faces are substantially longer than the combined length of the bearings therein.

20. The tool of claim 18 wherein said splineways are in fluid communication with the interior of the tool and the exterior of the tool so that a portion of the fluid under pressure within said tool can flow through the splineways to maintain them free from particles of solid foreign matter.

21. In an impact tool including a hammer mounted for reciprocation relative to a fluid supply conduit and an anvil, said hammer being provided with a first area exposed to fluid pressure from the conduit to urge the hammer toward the anvil and a second area disposed to be placed in fluid communication with the conduit to urge the hammer away from the anvil, the second area being larger than the first, and wherein control means actuated responsive to movement of the hammer are provided for selectively increasing and decreasing the pressure applied to the second area so as to cause the hammer to move away from the anvil and then to permit it to move toward the anvil under the influence of pressure exerted on said first area, the improvement which comprises in combination therewith of a mounting for the hammer including parts carried by the hammer and at least one of said conduit and anvil and arranged to telescope one within the other so as to present opposing faces to each other, a plurality of longitudinal splineways in each of said faces and arranged in pairs with the splineways of each pair in radial alignment with each other relative to the longitudinal axis of the hammer, and bearings in the pairs of said splineways, the length of the bearing in each of said pairs of splineways being sufficient to maintain said parts in telescoping alignment.

22. The tool of claim 21 wherein each of said splineway pairs contain a plurality of bearings, the combined length of the bearings in each splineway pair comprising a substantial proportion of the length of relative telescoping movement between said parts.

23. The tool of claim 22 wherein each of the splineways of each pair are substantially longer than said combined length of the bearings contained therein.

24. In an impact tool powered by a resilient fluid including a hammer mounted for reciprocation relative to a fluid supply conduit and an anvil, the conduit and anvil being movable longitudinally relative to each other, said hammer being provided with a first area exposable to fluid pressure from the conduit to urge the hammer toward the anvil and a second area which when exposed to pressure from said conduit is effective to urge the hammer away from the anvil, passage means for placing said second area in fluid communication with the conduit and with the exterior of the tool, first valve means controlling flow through the passage means upstream of the second area and closable responsive to the hammer moving to be within a predetermined distance of a point in the conduit upstream of the hammer, second valve means controlling flow through the passage means downstream of the second area and openable responsive to the hammer moving beyond a predetermined distance from the anvil but after the hammer has moved sufficiently toward said conduit point to close the first valve means whereby longitudinal movement of said conduit to position said point therein closer and farther away from the anvil determines the length of hammer travel with both valve means closed.

25. In an impact tool powered by a resilient fluid including a hammer mounted for reciprocation relative to a fluid supply conduit and an anvil, the conduit and anvil being movable longitudinally relative to each other, said hammer being provided with a first area exposable to fluid pressure from the conduit to urge the hammer toward the anvil and a second area which when exposed to pressure from said conduit is effective to urge the hammer away from the anvil, passage means for placing said second area in fluid communication with the conduit and with the exterior of the tool, valve elements respectively carried by the conduit and hammer and cooperable to restrict flow through the passage means upstream of the second area responsive to the hammer moving to be less than a predetermined distance from a point in the conduit upstream of the hammer and to permit flow through such passage means after the hammer has moved a predetermined distance from such point toward the anvil, valve members respectively carried by the hammer and anvil and cooperable to restrict flow through the passage means downstream of the second area at least after the hammer has struck the anvil and while it is moving through a portion of its movement toward said conduit point with said valve elements in flow restricting cooperation and to permit flow through the downstream passage means before the hammer moves through the remainder of its movement toward said point, whereby the extent of hammer travel with both said valve elements and members restricting flow through the passage means is regulatable by relative longitudinal movement between the conduit and anvil.

References Cited in the file of this patent

UNITED STATES PATENTS

| | | |
|---|---|---|
| 1,095,848 | Gilman | May 5, 1914 |
| 1,096,886 | Bayles | May 19, 1914 |
| 1,829,246 | Smith et al. | Oct. 27, 1931 |
| 1,861,042 | Zublin | May 31, 1932 |
| 1,881,258 | Bayles | Oct. 4, 1932 |
| 2,033,527 | Kitching | Mar. 10, 1936 |
| 2,085,279 | Tautenhahn | June 29, 1937 |